US009444296B2

(12) United States Patent
Funasaki et al.

(10) Patent No.: US 9,444,296 B2
(45) Date of Patent: Sep. 13, 2016

(54) STATOR WINDING OF ELECTRICAL ROTATING MACHINE

(75) Inventors: Yoichi Funasaki, Tokyo (JP); Kiyonori Koga, Tokyo (JP); Susumu Maeda, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 87 days.

(21) Appl. No.: 14/372,226

(22) PCT Filed: Apr. 19, 2012

(86) PCT No.: PCT/JP2012/060569
§ 371 (c)(1),
(2), (4) Date: Jul. 15, 2014

(87) PCT Pub. No.: WO2013/157115
PCT Pub. Date: Oct. 24, 2013

(65) Prior Publication Data
US 2014/0346914 A1    Nov. 27, 2014

(51) Int. Cl.
H02K 3/28    (2006.01)
(52) U.S. Cl.
CPC .................................... H02K 3/28 (2013.01)
(58) Field of Classification Search
CPC .............................. H02K 3/28; H02K 15/16
USPC ................................................. 310/179–208
See application file for complete search history.

(56) References Cited

U.S. PATENT DOCUMENTS 1,970,914 A * 8/1934 Kilbourne .............. H02K 17/12
318/724
2,046,992 A * 7/1936 Alger ..................... H02K 3/28
310/198
3,408,517 A    10/1968 Willyoung
(Continued)

FOREIGN PATENT DOCUMENTS

DE    2714188 A1    11/1977
DE    2741403 A1    3/1979
(Continued)

OTHER PUBLICATIONS

The extended European Search Report issued on Oct. 23, 2015, by the European Patent Office in corresponding European Application No. 12874692.2. (7 pages).
(Continued)

Primary Examiner — Terrance Kenerly
Assistant Examiner — Ahmed Elnakib
(74) Attorney, Agent, or Firm — Buchanan Ingersoll & Rooney PC

(57) ABSTRACT

In a three-phase, four-pole, four-parallel-circuit stator winding of an electrical rotating machine, each of two sets of U-phase output terminals U1, U2 is formed of two sets of parallel circuits each formed of windings having a same pitch (one is formed of first and second winding circuits 1, 2 and the other is formed of third and fourth winding circuits 3, 4). The winding of each winding circuit is formed of two serially-connected coil phase bands (coil phase bands a and b form the first winding circuit 1 and coil phase bands c and d, coil phase bands e and f, and coil phase bands g and h form the second, third, and fourth winding circuits 2, 3, 4, respectively). A voltage vector phase difference and a voltage difference between the winding circuits can be eliminated without providing a jumper wire to winding end portions.

1 Claim, 9 Drawing Sheets

(56) References Cited

U.S. PATENT DOCUMENTS

| | | | |
|---|---|---|---|
| 4,028,572 A | 6/1977 | Baltisberger | |
| 4,121,148 A | 10/1978 | Platzer | |
| 5,231,324 A * | 7/1993 | Kawamura | H02K 3/28 310/184 |
| 5,376,852 A * | 12/1994 | Kawamura | H02K 3/28 310/184 |
| 6,995,492 B1 | 2/2006 | Kouda et al. | |
| 2002/0130578 A1 | 9/2002 | Anma et al. | |
| 2009/0096312 A1 | 4/2009 | Tokumasu et al. | |
| 2009/0195105 A1 | 8/2009 | Tokumasu et al. | |

FOREIGN PATENT DOCUMENTS

| | | | |
|---|---|---|---|
| EP | 1653587 | * | 5/2006 |
| FR | 2272517 | A1 | 12/1975 |
| FR | 2378392 | A1 | 8/1978 |
| GB | 1470937 | | 4/1977 |
| JP | 54-6683 | B | 3/1979 |
| JP | 59-222066 | A | 12/1984 |
| JP | 61-52450 | U | 4/1986 |
| JP | 2000-350396 | A | 12/2000 |
| JP | 2002-272074 | A | 9/2002 |
| JP | 2009-100549 | A | 5/2009 |
| JP | 2009-183102 | A | 8/2009 |

OTHER PUBLICATIONS

Office Action issued on Sep. 30, 2014, by the Japanese Patent Office in corresponding Japanese Patent Application No. JP 2014-511038, and an English Translation of the Office Action. (6 pages).

International Search Report (PCT/ISA/210) mailed on Jul. 17, 2012, by the Japanese Patent Office as the International Searching Authority for International Application No. PCT/JP2012/060569.

* cited by examiner

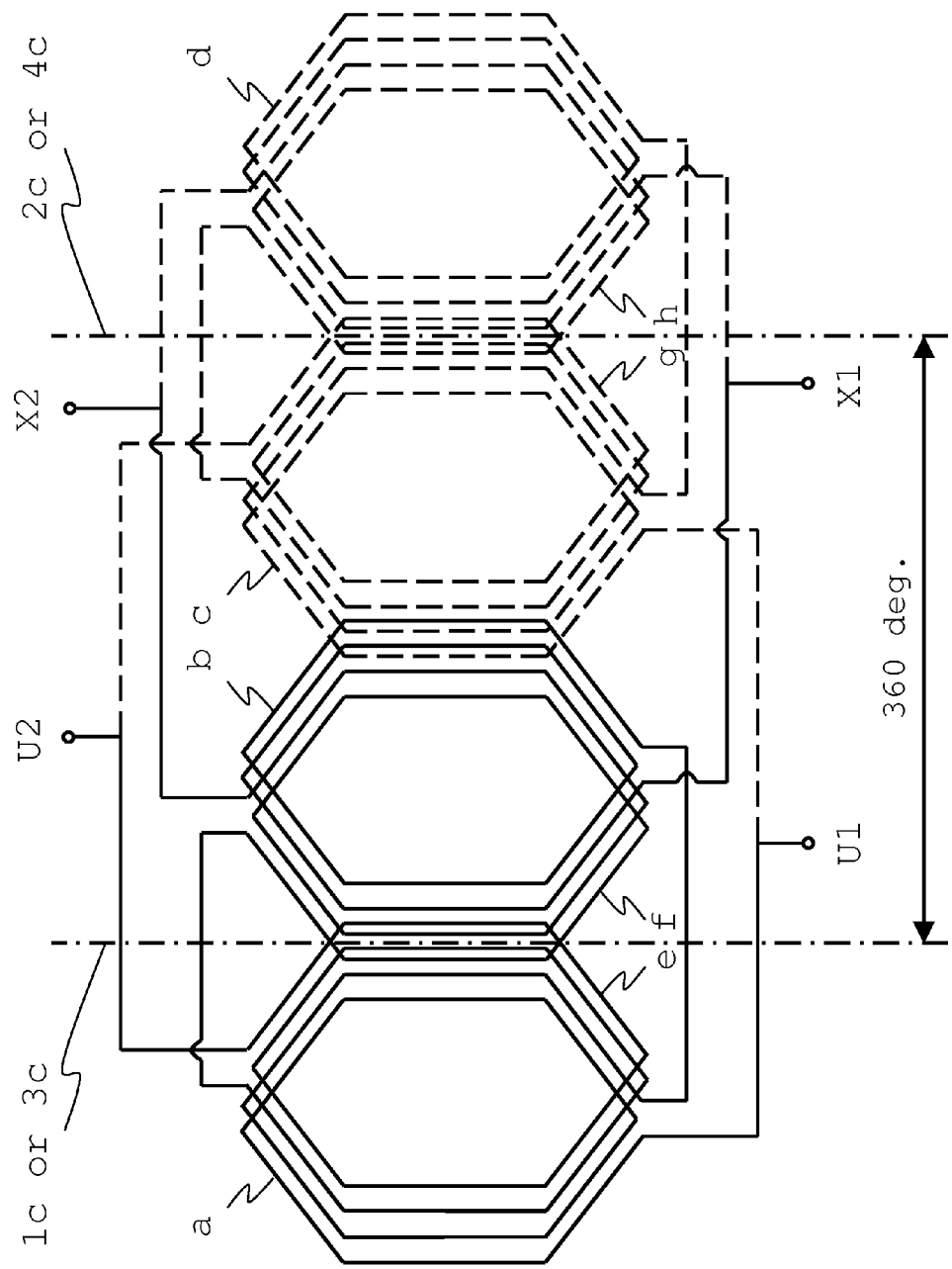

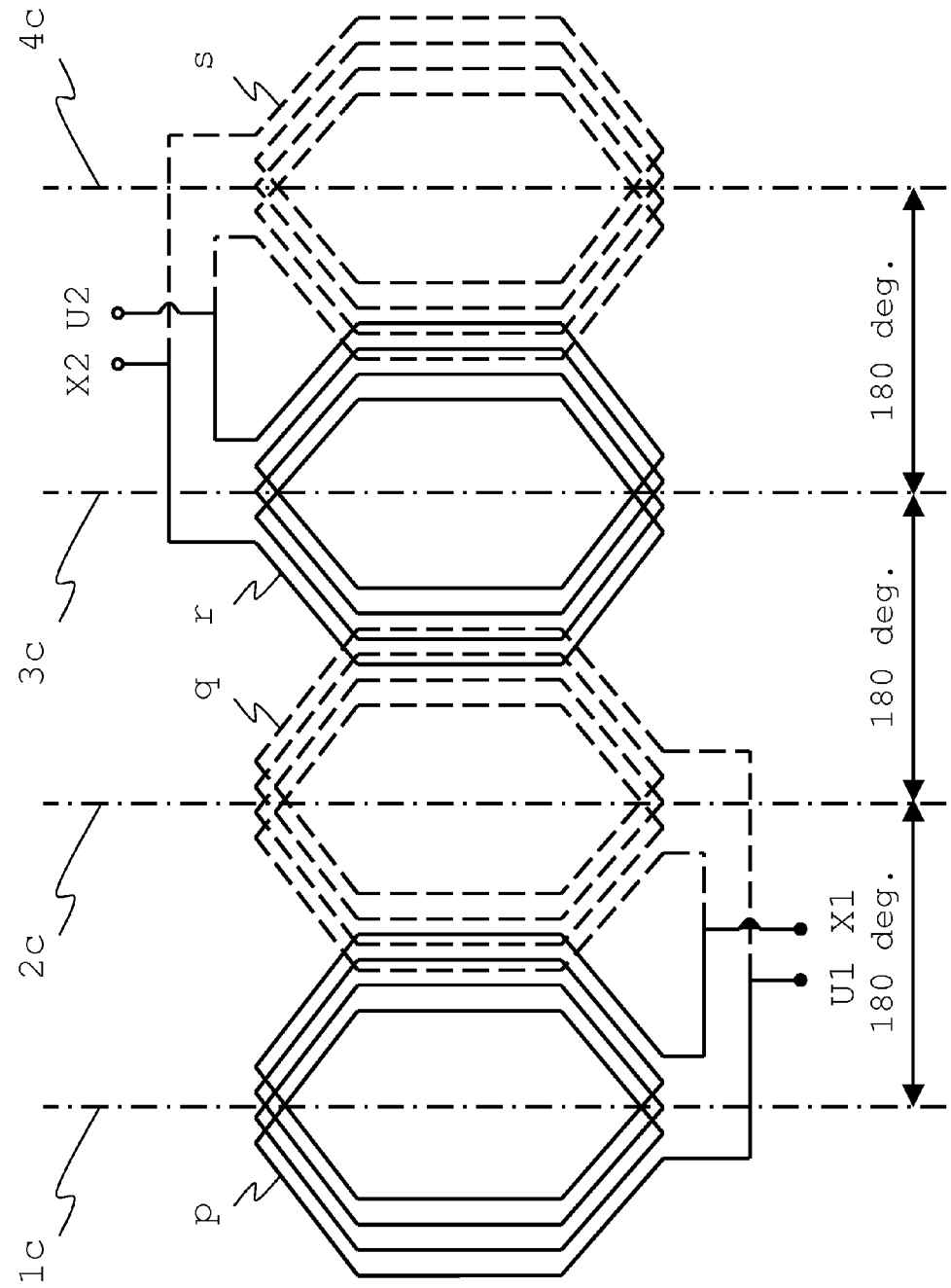

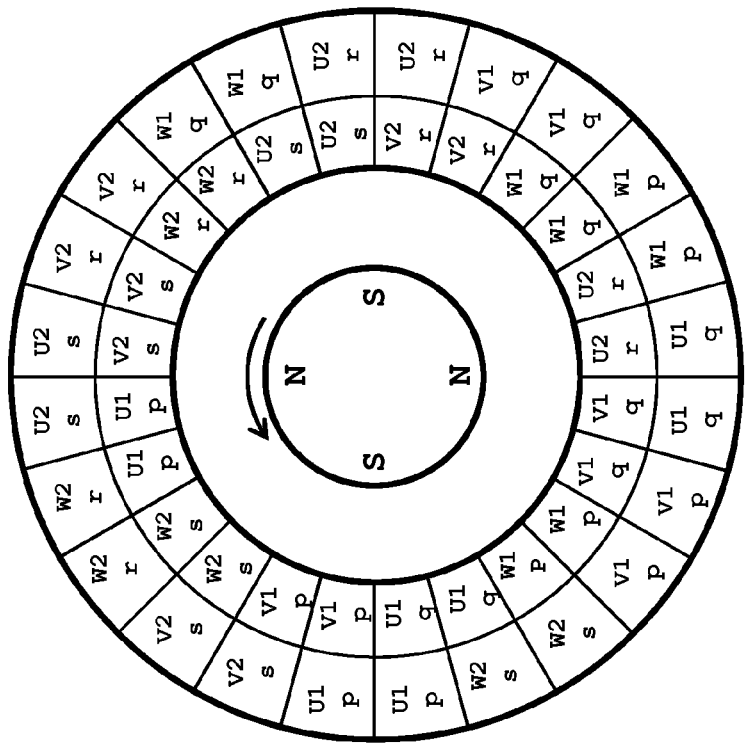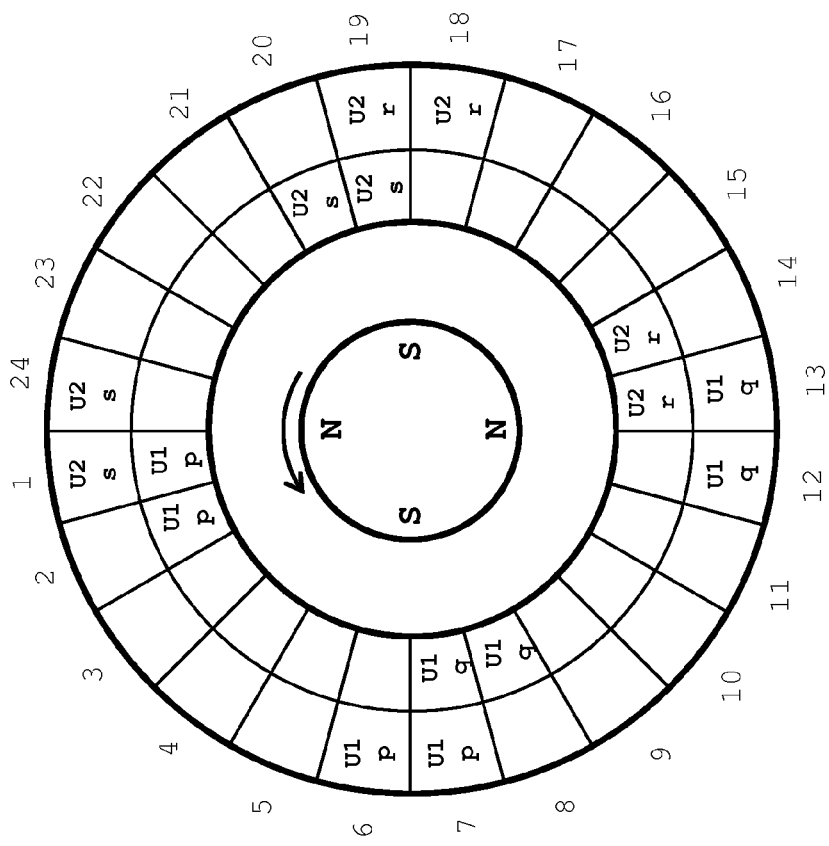
Fig.6A
Fig.6B

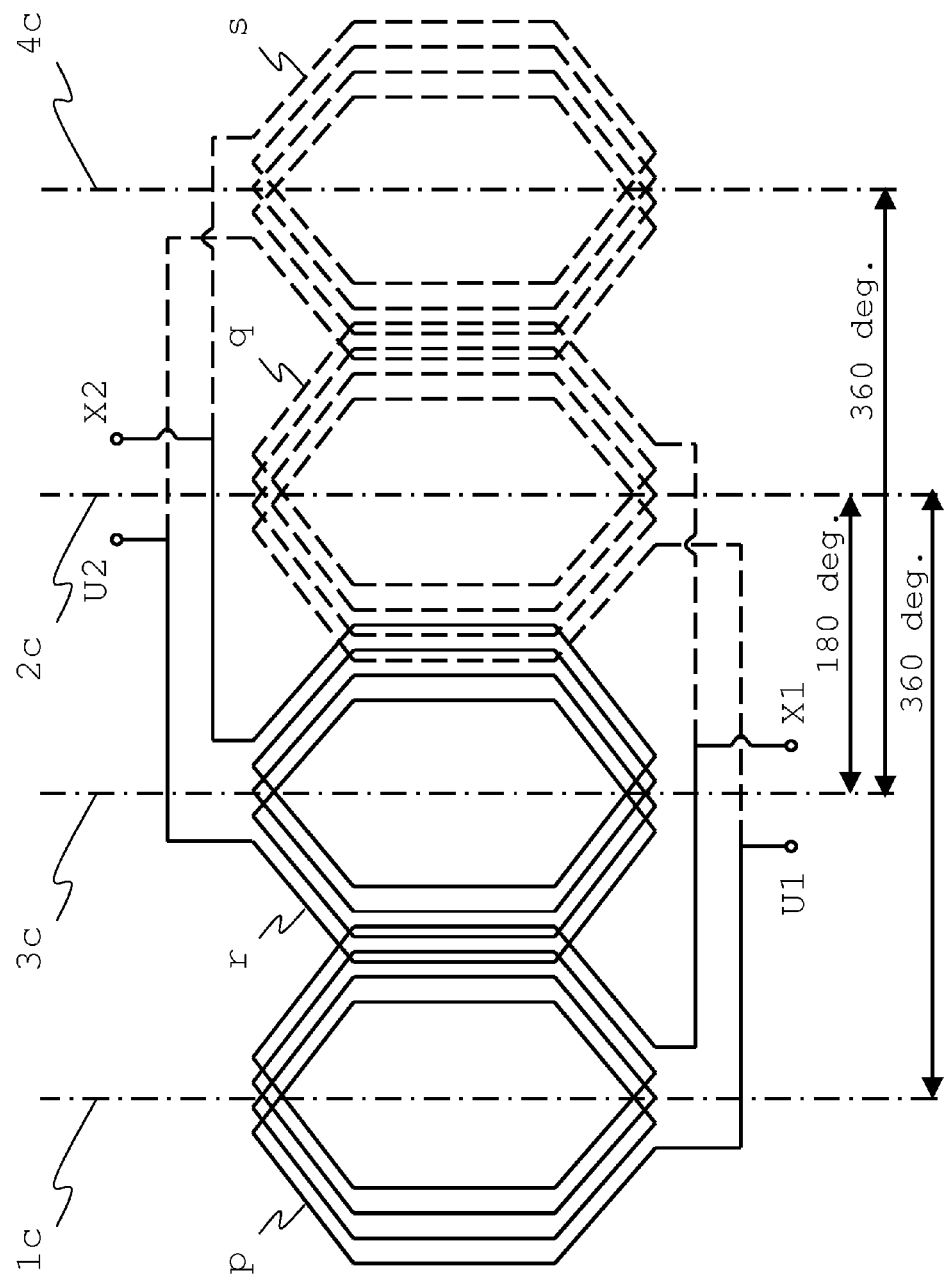

STATOR WINDING OF ELECTRICAL ROTATING MACHINE

TECHNICAL FIELD

The present invention relates to a three-phase, four-pole, four-parallel-circuit stator winding of an electrical rotating machine applied to an electrical rotating machine, such as a power generator.

BACKGROUND ART

A winding method of a typical stator coil in the related art of a rotating-field electrical rotating machine adopts a configuration such that lessens a voltage phase difference between winding circuits by placing one winding circuit as close as possible to the other winding circuit in parallel circuits of a same phase. However, even when the winding circuits are placed in close proximity to each other, displacement at least as wide as one stator slot is generated, and a non-negligible voltage phase difference occurs between the winding circuits. A circulation current flows between the winding circuits due to the voltage phase difference. Hence, there is a problem that the occurrence of a circulation current loss gives rise to a temperature rise of the stator coil and deterioration in efficiency of the electrical rotating machine.

An example of a method of eliminating such imbalance in voltage phase and magnitude between the winding circuits forming the parallel circuits is described in PTL 1 as an armature winding pattern for a multi-phase power generator, and this method aims for a winding pattern of a two-layer lap winding. According to this method, in a lap winding for a multi-phase electrical machine with two or more circuits per pole per phase, a circuit order of coil sides in a top layer of a given phase band and a circuit order of coil sides in a bottom layer of the same phase band are changed by varying pitches of respective other coils within one circuit. According to this winding pattern, the circuit order of all the coil sides in a given layer (top layer or bottom layer) of a given phase band is exchanged with the circuit order in the other layer (bottom layer or top layer) of this phase band. Consequently, imbalance in phase and magnitude of composite voltages generated in the respective parallel circuits of the each phase winding is substantially eliminated.

There is also a method for an armature described in PTL 2. A 72-slot armature core and a three-phase, two-pole, four-parallel-circuit armature winding stored in the slots are connected in the following manner. That is, let relative positions of a upper coil piece and a lower coil piece in one of phase bands be indicated by positions counted in a direction away from a pole center, then the upper coil pieces and the lower piece coils in first and third parallel circuits are at first, fourth, sixth, seventh, tenth, and twelfth positions from the pole center, and the upper coil pieces and the lower coil pieces in second and fourth parallel circuits are at second, third, fifth, eighth, ninth, and eleventh positions. Owing to the connection as above, insulation properties and fixing strength can be more readily secured by making a work with a jumper wire connection portion easier when the armature winding is formed while reducing a circulation current loss between the parallel circuits by lessening imbalance in voltage among the respective parallel circuits.

Further, there is a method for an armature winding of an electrical rotating machine described in PTL 3. This armature winding is a two-layer, four-parallel-circuit armature winding with 14 coils per pole per phase applied to a three-phase, two-pole, 84-slot electrical rotating machine. Each phase band of the winding has two parallel circuits and stored in a slot 13 provided to a laminated core. Each parallel circuit has series coils and each series coil has two coil pieces; an upper coil piece 15 and a lower coil piece 16 connected to each other at a coil end 19a on a connection side and a coil end 19b on an opposite side to the connection side. Let relative positions of the upper and lower coil pieces in one phase band be indicated by positions counted from the pole center, then halves of the respective parallel circuits are connected so that the upper and lower coil pieces are positioned at first, fourth, sixth, seventh, ninth, twelfth, and fourteenth positions from the pole center, and the remaining halves of the respective parallel circuits are connected so that the upper and lower coil pieces are positioned at second, third, fifth, eighth, tenth, eleventh, and thirteenth positions from the pole center. Owing to the connection as above, a circulation current loss between the parallel circuits is reduced by lessening imbalance in voltage among the respective parallel circuits.

CITATION LIST

Patent Literature

PTL 1: JP-B-54-6683
PTL 2: JP-A-2009-100549
PTL 3: JP-A-2009-183102

SUMMARY OF INVENTION

Technical Problem

According to PTLs 1, 2, and 3 in the related art, a voltage difference generated between the winding circuits is lessened by changing the winding pitch within the winding circuits forming the parallel circuits. These techniques, however, increase complexity of the winding method and also increase complexity of an end portion structure because of a need to provide a jumper wire to winding end portions. Further, there is a problem that no solution is proposed for a three-phase, four-pole, four-parallel-circuit stator winding of a rotating-field electrical rotating machine provided with two sets of output terminals per phase.

The invention was devised to solve the problems discussed above and has an object to provide a stator winding of an electrical rotating machine, which is a three-phase, four-pole, four-parallel-circuit stator winding of an electrical rotating machine achieving a winding layout that eliminates a voltage vector phase difference and a voltage difference between winding circuits forming parallel circuits without increasing complexity of a winding method and providing a jumper wire to winding end portions.

Solution to Problem

According to a first stator winding of an electrical rotating machine of the invention, each phase of a three-phase, four-pole, four-parallel-circuit stator winding of an electrical rotating machine is placed on a circumference and formed of two sets of parallel circuits, in each of which two winding circuits formed of winding groups having a same pitch are connected in parallel; center axes of the winding groups of the two winding circuits in a same set of the parallel circuits are placed at positions spaced by 180 or 360 electrical degrees; the winding group of each winding circuit is formed of two coil phase bands which are connected in series and have winding directions different from each other;

and the two coil phase bands are placed at mirror symmetrical positions with respect to the center axis of the winding group of the winding circuit.

Also, according to a second stator winding of an electrical rotating machine of the invention, each phase of a three-phase, four-pole, four-parallel-circuit stator winding of an electrical rotating machine is placed on a circumference and formed of two sets of parallel circuits, in each of which two winding circuits formed of winding groups having a same pitch are connected in parallel; center axes of the winding groups of the two winding circuits in a same set of the parallel circuits are placed at positions spaced by 180 or 360 electrical degrees; the winding group of each winding circuit is formed of one coil phase band; and winding directions of the coil phase bands of the two winding circuits in the same set of the parallel circuits are different.

Further, according to a third stator winding of an electrical rotating machine of the invention, each phase of a three-phase, four-pole, four-parallel-circuit stator winding of an electrical rotating machine is placed on a circumference and formed of two sets of parallel circuits, in each of which two winding circuits formed of winding groups having a same pitch are connected in parallel; center axes of the winding groups of the two winding circuits in a same set of the parallel circuits are placed at positions spaced by 180 or 360 electrical degrees; the winding group of each winding circuit is formed of one coil phase band; and winding directions of the coil phase bands of the two winding circuits in the same set of the parallel circuits are same.

Advantageous Effects of Invention

According to the stator winding of the electrical rotating machine of the invention, by placing coil phase bands so as to eliminate a phase difference of voltage vectors and a voltage difference between the winding circuits forming the parallel circuits, a circulation current flowing between the winding circuits is eliminated. Hence, there can be achieved an effect that a temperature rise of the winding and deterioration in efficiency caused by the occurrence of a loss can be avoided. Also, because a winding pitch of the coil phase bands is not varied, there is no need to provide a jumper wire to end portions of the coil phase bands. Hence, there can be achieved another effect that an increase in complexity of an end portion structure can be avoided, which can in turn enhance workability.

BRIEF DESCRIPTION OF DRAWINGS

FIG. 1 is a view showing a winding pattern for a phase U of a stator winding of an electrical rotating machine according to a first embodiment.

FIG. 4 is a view showing a winding pattern for a phase U of a stator winding of an electrical rotating machine of a second embodiment.

FIG. 6A and FIG. 6B are schematic views showing a layout of coil phase bands of the phase U on a circumference in the second embodiment.

FIG. 7 is a view showing a winding pattern for a phase U of a stator winding of an electrical rotating machine of a third embodiment.

DESCRIPTION OF EMBODIMENTS

A stator winding of an electrical rotating machine of the invention is a three-phase, four-pole, four-parallel-circuit stator winding of a rotating-field electrical rotating machine, and formed of two sets of parallel circuits per phase, in each of which two winding circuits formed of winding groups having a same pitch are connected in parallel. Coil phase bands of the winding circuits are placed so that center axes of the winding groups forming the two winding circuits in a same set of the parallel circuits are placed at positions spaced by 180 or 360 electrical degrees. Owing to this layout, a voltage vector phase difference between the winding circuits is eliminated and a difference in magnitude of the voltages is also eliminated. Consequently, because a circulation current flowing between the winding circuits is eliminated, a temperature rise of the winding and deterioration in efficiency caused by the occurrence of a loss can be avoided. Hereinafter, stator windings of an electrical rotating machine according to embodiments of the invention will be described with reference to FIG. 1 through FIG. 9.

First Embodiment

Figure 2B:
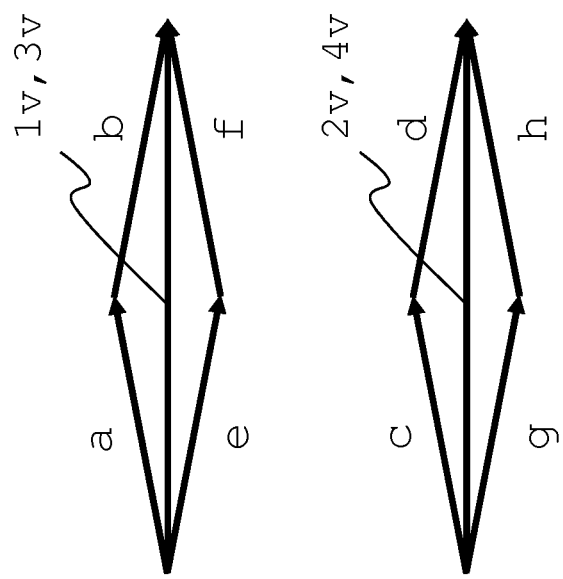
FIG. 2A is a view showing an equivalent circuit and FIG. 2B is a voltage vector of the phase U in the first embodiment.

FIG. 1 is a view showing a winding pattern for a phase U of a stator winding of an electrical rotating machine according to a first embodiment. FIG. 2 is a view showing an equivalent circuit diagram and a voltage vector of the phase U in the first embodiment. FIG. 3 is a schematic view showing a layout of coil phase bands on a circumference in the first embodiment.

Figure 2A:
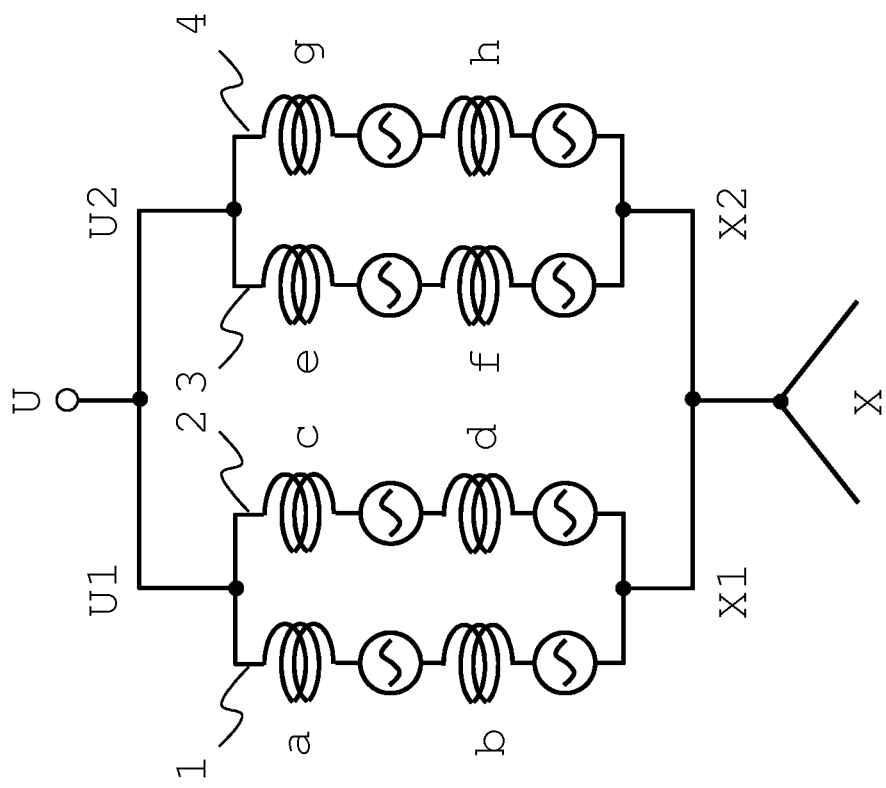

As is shown in the winding pattern of FIG. 1 and an equivalent circuit of FIG. 2A, according to the winding pattern for the phase U of the stator winding of the electrical rotating machine of the first embodiment, each of two sets of output terminals U1 and U2 is formed of two sets of parallel circuits formed of windings having a same pitch (one set is formed of a first winding circuit 1 and a second winding circuit 2 and the other set is formed of a third winding circuit 3 and a fourth winding circuit 4). The winding of each winding circuit is formed of serially-connected two coil phase bands (coil phase bands a and b form the first winding circuit 1, coil phase bands c and d form the second winding circuit 2, coil phase bands e and f form the third winding circuit 3, and coil phase bands g and h form the fourth winding circuit 4). The coil phase band referred to herein means a coil group in multiple grooves which are adjacent to each other and in which a same current flows. In the first embodiment, winding pitches of the coil phase bands a through h forming the winding are all the same. Also, coil winding directions are opposite to each other in the coil phase bands a and b, in the coil phase bands c and d, in the coil phase bands e and f, and in the coil zones g and h. FIG. 1 and FIG. 2 show only the phase U of the three phase-windings. Because the same applies to the phase V and the phase W, a description is omitted herein.

An operation of the stator winding of the electrical rotating machine of the first embodiment will now be described with reference to FIG. 1 through FIG. 3. As is shown in FIG. 3, a stator winding 11 is provided on the periphery of a rotor 10 with a four-pole field. The stator winding 11 is divided to 24 columns along the circumference and coil sides are stored in inner and outer columns. An example shown in the drawing is a case where the winding pitch is 0.833 (=⅚). The example shows that one column on the circumference occupies 15 mechanical degrees and coil sides of the coil phase bands specified in the column are stored in the slot groups present within 15°. For example, when the number of slots is 72, 72×15°/360°=3 slots/15°, and when the number of slots is 48, 48×15°/360°=2 slots/15°.

Figure 3A:
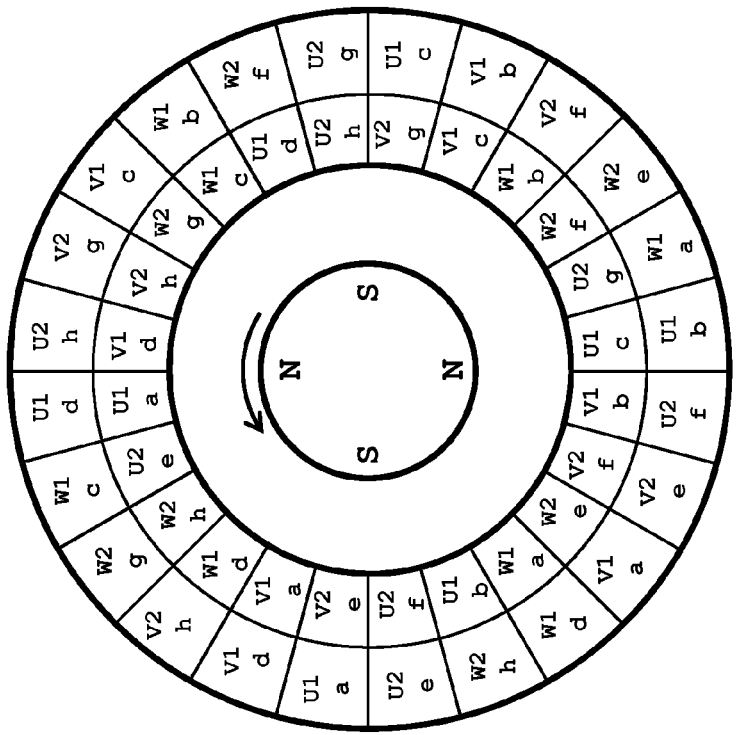
FIG. 3A and FIG. 3B are schematic views showing a layout of coil phase bands of the phase U on a circumference in the first embodiment.
Figure 3B:
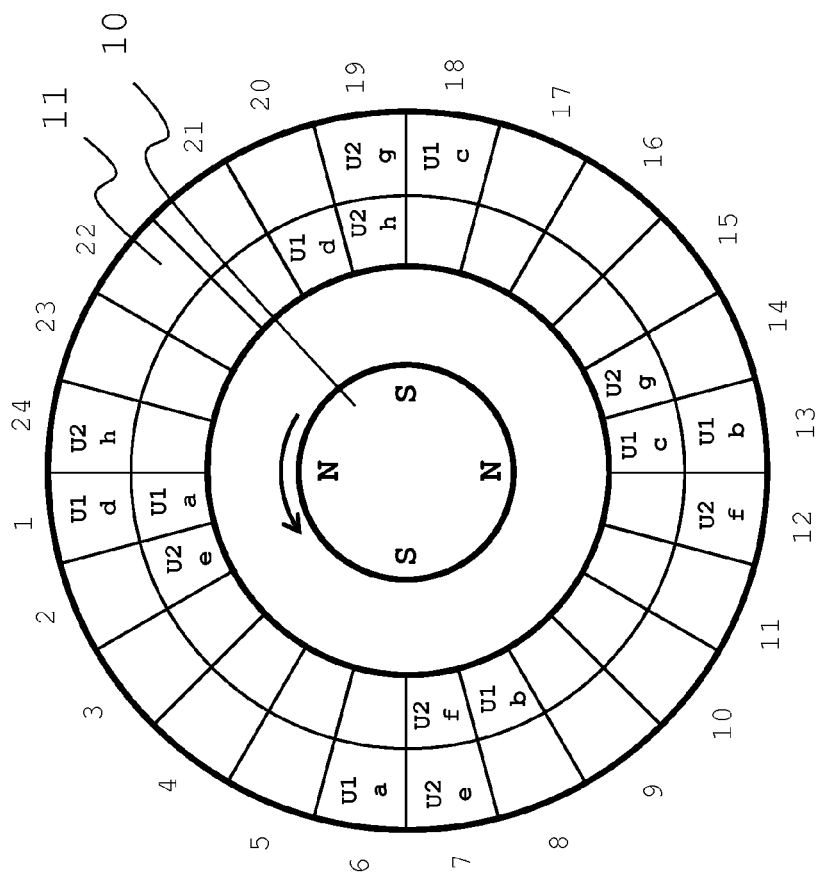

As is shown in FIG. 3A, regarding the first winding circuit 1 connected to the output terminal U1, the coil sides of the coil phase band a are placed in the inner column 1 and the outer column 6 and the coil sides of the coil phase band b are placed in the inner column 8 and the outer column 13. Likewise, regarding the second winding circuit 2, the coil sides of the coil phase band c are placed in the inner column 13 and the outer column 18 and the coil sides of the coil phase band d are placed in the inner column 20 and the outer column 1. Also, regarding the third winding circuit 3 connected to the output terminal U2, the coil sides of the coil phase band e are placed in the inner column 2 and the outer column 7 and the coil sides of the coil phase band f are placed in the inner column 7 and the outer column 12. Likewise, regarding the fourth winding circuit 4, the coil sides of the coil phase band g are placed in the inner column 14 and the outer column 19 and the coil sides of the coil phase band h are placed in the inner column 19 and the outer column 24. The coil phase bands of the other phase V and phase W are placed according to the same rule. The phase V and the phase W are placed at positions displaced by 120 electrical degrees (=60 mechanical degrees) from each other in a rotation direction of the rotor 10 from where the U-phase coil is placed. FIG. 3B shows an overall layout view of the coil phase bands of three phases.

When the coil phase bands are placed in this manner, as is shown in FIG. 3A, regarding the coil phase bands a and b forming the first winding circuit 1 and the coil phase bands e and f forming the third winding circuit 3, a voltage vector of the coil phase band a generates one column of phase displacement (phase displacement of 15 mechanical degrees or 30 electrical degrees) with respect to a voltage vector of the coil phase band e. However, a voltage vector of the coil phase band b generates comparable phase displacement in the opposite direction (phase displacement of −15 mechanical degrees or −30 electrical degrees) with respect to a voltage vector of the coil phase band f. Hence, a voltage vector of the first winding circuit 1 and a voltage vector of the third winding circuit 3, both of which are composites of the corresponding voltage vectors, become the same phase. These composite voltage vectors are $1v$ and $3v$. The same applies to the other winding circuits 2 and 4 and the respective composite voltage vectors are $2v$ and $4v$. Let a voltage vector generated in one turn of coil be indicated at the center position of the coil. Then, the positions of $1v$ through $4v$ fall on the positions of the center axes of the winding groups forming the corresponding winding circuits in FIG. 1 showing the winding pattern.

Also, because the coil phase bands are placed as in FIG. 3A, the coil phase band a and the coil phase band b of the first winding circuit 1 are at mirror symmetrical positions with respect to a center axis $1c$ of the winding group forming the first winding circuit 1. Also, the coil phase band e and the coil phase band f of the third winding circuit 3 are at mirror symmetrical positions with respect to a center axis $3c$ of the winding group forming the third winding circuit 3. The coil phase band a and the coil phase band b are placed on the outer side of the coil phase band e and the coil phase band f, respectively. Likewise, the coil phase band c and the coil phase band d of the second winding circuit 2 are at mirror symmetrical positions with respect to a center axis $2c$ of the winding group forming the second winding circuit 2. Also, the coil phase band g and the coil phase band h of the fourth winding circuit 4 are at mirror symmetrical positions with respect to a center axis $4c$ of the winding group of the fourth winding circuit 4. The coil phase band c and the coil phase band d are placed on the outer side of the coil phase band g and the coil phase band h, respectively. The composite voltage vector $1v$ or $3v$ and the composite voltage vector $2v$ or $4v$, that is, the center axis $1c$ or $3c$ of the first winding circuit 1 or the third winding circuit 3 and the center axis $2c$ or $4c$ of the second winding circuit 2 or the fourth winding circuit 4 are spaced by 360 electrical degrees. Hence, a phase difference between the respective composite voltage vectors becomes 0°. By placing the coil phase bands having the same winding pitch according to the rule shown in FIG. 3, a voltage vector phase difference between the first winding circuit 1 and the third winding circuit 3 and a voltage vector phase difference between the second winding circuit 2 and the fourth winding circuit 4 are eliminated, so that a voltage vector phase difference between the first winding circuit 1 (third winding circuit 3) and the second winding circuit 2 (fourth winding circuit 4) can be lessened to 0° and further, the voltages can be equal in magnitude. The same applies to the other phase V and phase W.

As has been described, according to the stator winding of the electrical rotating machine of the first embodiment, by setting an interval between positions of the center axes of the winding groups forming the winding circuits to a predetermined value and placing the coil phase bands so as to eliminate a voltage difference, a circulation current flowing between the winding circuits is eliminated. Hence, there can be achieved an effect that a temperature rise of the winding and deterioration in efficiency caused by the occurrence of a loss can be avoided. Also, because the winding pitch of the coil phase bands is not varied, there is no need to provide a jumper wire to end portions of the coil phase bands. Hence, there can be achieved another effect that an increase in complexity of an end portion structure can be avoided, which can in turn enhance workability.

Second Embodiment

FIG. 4 is a view showing a winding pattern for a phase U of a stator winding of an electrical rotating machine according to a second embodiment. FIG. 5 is a view showing an equivalent circuit diagram and a voltage vector of the phase U in the second embodiment. FIG. 6 is a schematic view showing a layout of coil phase bands on a circumference in the second embodiment.

Figures 5A, 5B:
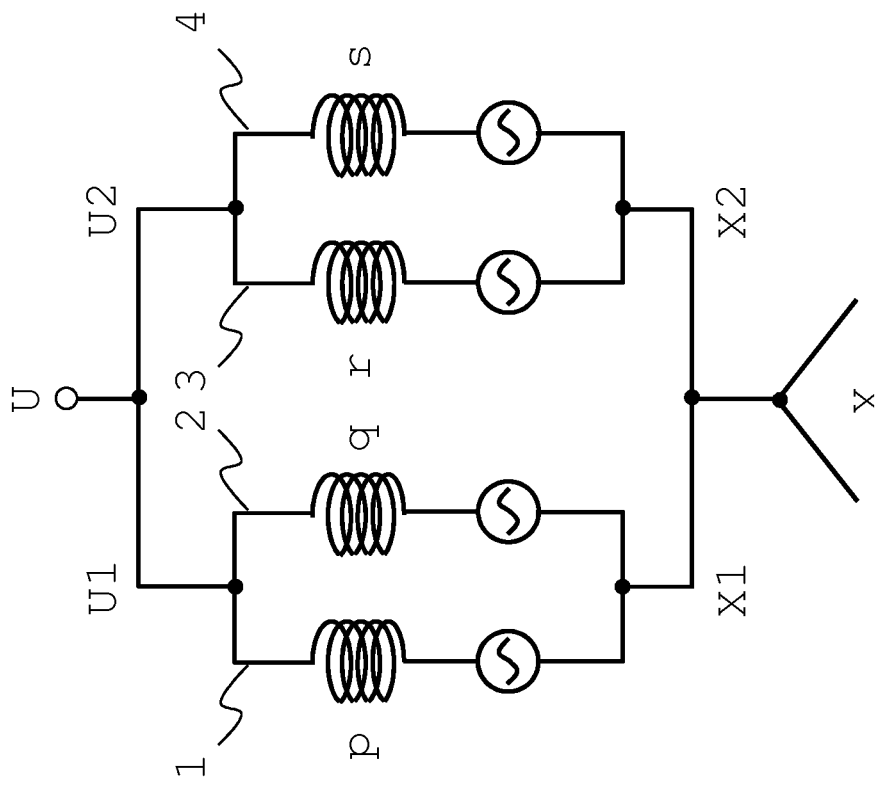
FIG. 5A is a view showing an equivalent circuit and FIG. 5B is a voltage vector of the phase U in the second embodiment.

As is shown in the winding pattern of FIG. 4 and an equivalent circuit of FIG. 5A, according to the winding pattern for the phase U of the stator winding of the electrical rotating machine of the second embodiment, each of two sets of output terminals U1 and U2 is formed of two sets of parallel circuits formed of windings having a same pitch (one set is formed of a first windings circuit 1 and a second winding circuit 2 and the other set is formed of a third winding circuit 3 and a fourth winding circuit 4). The winding of each winding circuit is formed of one coil phase band (a coil phase band p forms the first winding circuit 1, a coil phase band q forms the second winding circuit 2, a coil phase band r forms the third winding circuit 3, and a coil phase band s forms the fourth winding circuit 4). In the second embodiment, winding pitches of the coil phase bands p through s are all the same. Coil winding directions are opposite to each other in the coil phase bands p and q and in the coil phase bands r and s. FIG. 4 and FIG. 5 show only the phase U of the three phase-windings. Because the same applies to the phase V and the phase W, a description is omitted herein.

An operation of the stator winding of the electrical rotating machine of the second embodiment will now be described with reference to FIG. 4 through FIG. 6. As is shown in FIG. 6 and as in the first embodiment above, a stator winding 11 is provided on the periphery of a rotor 10 with a four-pole field. The stator winding 11 is divided to 24 columns along the circumference and coil sides are stored in inner and outer columns. The example shown in the drawing is a case where the winding pitch is 0.833 (=5/6). The example shows that one column on the circumference occupies 15 mechanical degrees and coil sides of the coil phase bands specified in the column are stored in the slot groups present within 15°. For example, when the number of slots is 72, 72×15°/360°=3 slots/15°, and when the number of slots is 48, 48×15°/360°=2 slots/15°.

As is shown in FIG. 6A, regarding the first winding circuit 1 connected to the output terminal U1, coil sides of the coil phase band p are placed in the inner column 1 and the outer column 6 and also in the inner column 2 and the outer column 7. Likewise, coil sides of the coil phase band q of the second winding circuit 2 are placed in the inner column 7 and the outer column 12 and also in the inner column 8 and the outer column 13. Also, regarding the third winding circuit 3 connected to the output terminal U2, coil sides of the coil phase band r are placed in the inner column 13 and the outer column 18 and also in the inner column 14 and the outer column 19. Likewise, coil sides of the coil phase band s of the fourth winding coil circuit 4 are placed in the inner column 19 and the outer column 24 and also in the inner column 20 and the outer column 1. The coil phase bands of the other phase V and phase W are placed according to the same rule. The phase V and the phase W are placed at positions displaced by 120 electrical degrees (=60 mechanical degrees) from each other in a rotation direction of the rotor 10 from where the U-phase coil is placed. FIG. 6B shows an overall layout view of the coil phase bands of three phases.

When the coil phase bands are placed in this manner, as is shown in FIG. 6A, the coil phase band p of the first winding circuit 1 and the coil phase band q of the second winding circuit 2 are at positions 90 mechanical degrees apart, that is, 180 electrical degrees apart. In other words, a center axis 1c of a winding group forming the first winding circuit 1 and a center axis 2c of a winding group forming the second winding circuit 2 have an interval of 90 mechanical degrees, that is, 180 electrical degrees. Consequently, a phase difference between a voltage vector 1v of the first winding circuit 1 and a voltage vector 2v of the second winding circuit 2 becomes 0°. Likewise, the coil phase band q of the second winding circuit 2 and the coil phase band r of the third winding circuit 3 are at positions 90 mechanical degrees apart, that is, 180 electrical degrees apart. In other words, the center axis 2c of the winding group forming the second winding circuit 2 and a center axis 3c of a winding group forming the third winding circuit 3 have an interval of 90 mechanical degrees, that is, 180 electrical degrees. Consequently, a phase difference between the voltage vector 2v of the second winding circuit 2 and a voltage vector 3v of the third winding circuit 3 becomes 0°. Also, the coil phase band r of the third winding circuit 3 and the coil phase band s of the fourth winding circuit 4 are at positions 90 mechanical degrees apart, that is, 180 electrical degrees apart. In other words, the center axis 3c of the winding group forming the third winding circuit 3 and a center axis 4c of a winding group forming the fourth winding circuit 4 have an interval of 90 mechanical degrees, that is, 180 electrical degrees. Consequently, a phase difference between the voltage vector 3v of the third winding circuit 3 and a voltage vector 4v of the fourth winding circuit 4 becomes 0°. By placing the coil phase bands having the same winding pitch according to the rule shown in FIG. 6, a voltage vector phase difference between the winding circuits can be lessened to 0° and further, the voltages can be equal in magnitude. The same applies to the other phase V and phase W.

As has been described, according to the stator winding of the electrical rotating machine of the second embodiment, as in the first embodiment above, by setting an interval between positions of the center axes of the winding groups forming the winding circuits to a predetermined value and placing the coil phase bands so as to eliminate a voltage difference, a circulation current flowing between winding circuits is eliminated. Hence, there can be achieved an effect that a temperature rise of the winding and deterioration in efficiency caused by the occurrence of a loss can be avoided. Also, because the winding pitch of the coil phase bands is not varied, there is no need to provide a jumper wire to end portions of the coil phase bands. Hence, there can be achieved another effect that an increase in complexity of an end structure can be avoided, which can in turn enhance workability.

Third Embodiment

FIG. 7 is a view showing a winding pattern for a phase U of a stator winding of an electrical rotating machine according to a third embodiment. FIG. 8 is a view showing an equivalent circuit diagram and a voltage vector of the phase U in the third embodiment. FIG. 9 is a schematic view showing a layout of coil phase bands on a circumference in the third embodiment.

Figures 8A, 8B:
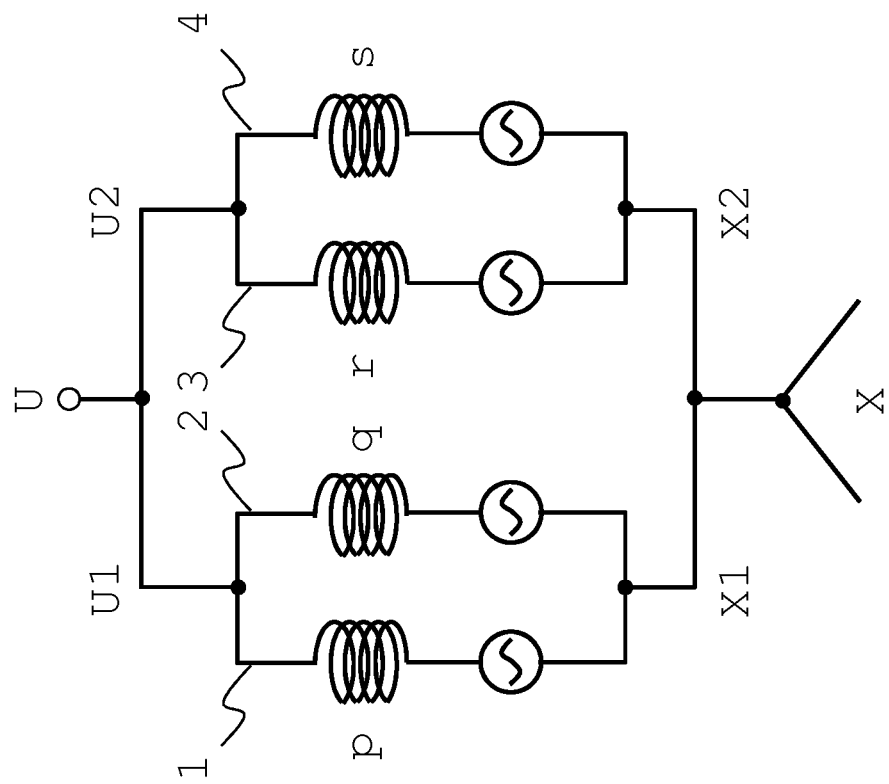
FIG. 8A is a view showing an equivalent circuit and FIG. 8B is a voltage vector of the phase U in the third embodiment.

As is shown in the winding pattern of FIG. 7 and an equivalent circuit of FIG. 8A, according to the winding pattern for the phase U of the stator winding of the electrical rotating machine of the third embodiment, as in the second embodiment above, each of two sets of output terminals U1 and U2 is formed of two sets of parallel circuits formed of windings having a same pitch (one set is formed of a first winding circuit 1 and a second winding circuit 2 and the other set is formed of a third winding circuit 3 and a fourth winding circuit 4). The winding of each winding circuit is formed of one coil phase band (a coil phase band p forms the first winding circuit 1, a coil phase band q forms the second winding circuit 2, a coil phase band r forms the third winding circuit 3, and a coil phase band s forms the fourth winding circuit 4). In the third embodiment, winding pitches of the coil phase bands p through s are all the same. Coil winding directions are the same in the coil phase band p and the coil phase band q and in the coil phase band r and the coil phase band s. FIG. 7 and FIG. 8 show only the phase U of the three phase-windings. Because the same applies to the phase V and the phase W, a description is omitted herein. A difference of the third embodiment from the second embodiment above is that, as is shown in FIG. 9, the coil phase bands of the winding circuits are placed at different positions on the circumference.

An operation of the stator winding of the electrical rotating machine of the third embodiment will now be described with reference to FIG. 7 through FIG. 9. As is shown in FIG. 9 and as in the first embodiment and the second embodiment above, a stator winding 11 is provided on the periphery of a rotor 10 with a four-pole field. The stator winding 11 is divided to 24 columns along the circumference and coil sides are stored in inner and outer columns. The example shown in the drawing is a case where the winding pitch is 0.833 (=⅚). The example shows that one column on the circumference occupies 15 mechanical degrees and coil sides of the coil phase bands specified in the column are stored in the slot groups present within 15°. For example, when the number of slots is 72, 72×15°/360°=3 slots/15°, and when the number of slots is 48, 48×15°/360°=2 slots/15°.

Figure 9B:
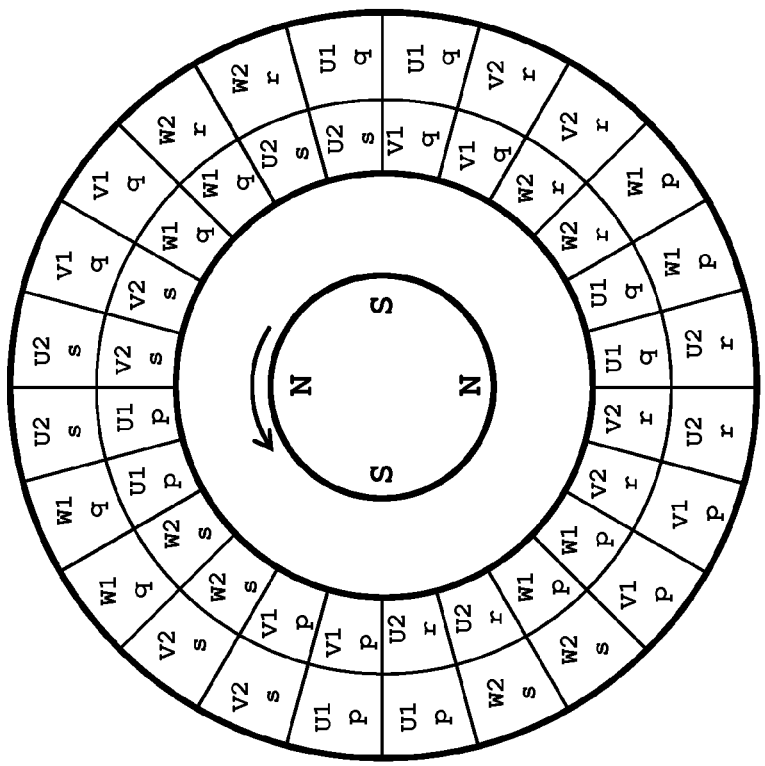
FIG. 9A and FIG. 9B are schematic views showing a layout of coil phase bands of the phase U on a circumference in the third embodiment.
Figure 9A:
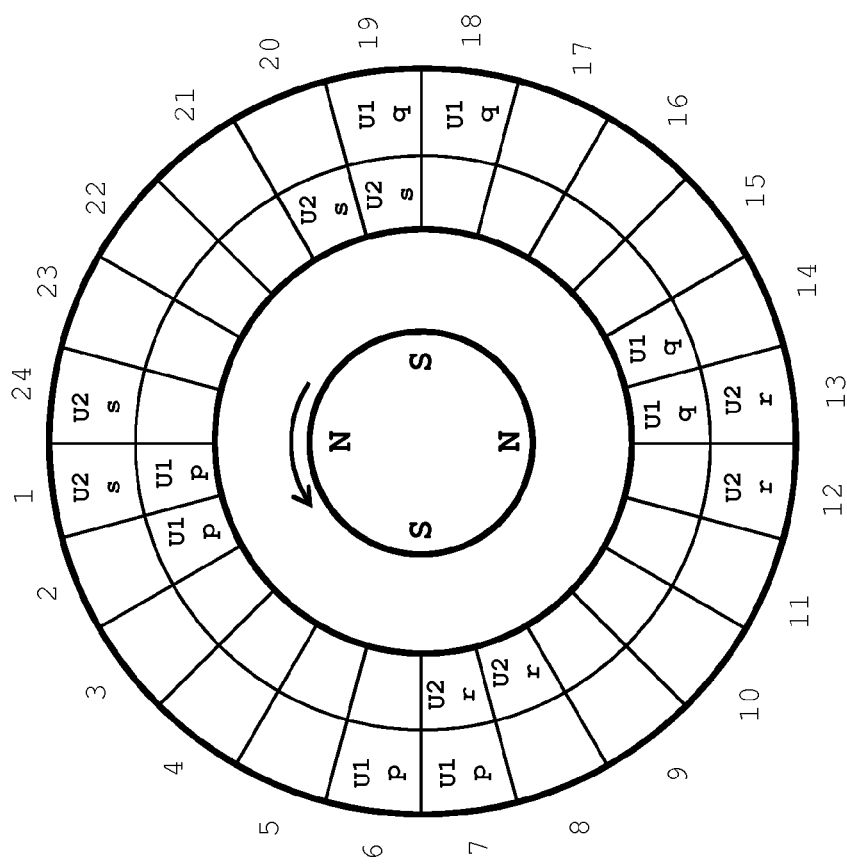

As is shown in FIG. 9A, regarding the first winding circuit 1 connected to the output terminal U1, coil sides of the coil phase band p are placed in the inner column 1 and the outer column 6 and also in the inner column 2 and the outer column 7. Likewise, coil sides of the coil phase band q of the second winding circuit 2 are placed in the inner column 13 and the outer column 18 and also in the inner column 14 and the outer column 19. Also, regarding the third winding circuit 3 connected to the output terminal U2, coil sides of the coil phase band r are placed in the inner column 7 and the outer column 12 and also in the inner column 8 and the outer column 13. Likewise, coil sides of the coil phase band s of the fourth winding circuit 4 are placed in the inner column 19 and the outer column 24 and also in the inner column 20 and the outer column 1. The coil phase bands of the other phase V and phase W are placed according to the same rule. The phase V and the phase W are placed at positions displaced by 120 electrical degrees (=60 mechanical degrees) from each other in a rotation direction of the rotor 10 from where the U-phase coil is placed. FIG. 9B shows an overall layout view of the coil phase bands of three phases.

When the coil phase bands are placed in this manner, as is shown in FIG. 9A, the coil phase band p of the first winding circuit 1 and the coil phase band q of the second winding circuit 2 are at positions 180 mechanical degrees apart, that is, 360 electrical degrees apart. In other words, a center axis 1c of a winding group forming the first winding circuit 1 and a center axis 2c of a winding group forming the second winding circuit 2 have an interval of 180 mechanical degrees, that is, 360 electrical degrees. Consequently, a phase difference between a voltage vector 1v of the first winding circuit 1 and a voltage vector 2v of the second winding circuit 2 becomes 0 electrical degree. Likewise, the coil phase band q of the second winding circuit 2 and the coil phase band r of the third winding circuit 3 are at positions 90 mechanical degrees apart, that is, 180 electrical degrees apart. In other words, the center axis 2c of the winding group forming the second winding circuit 2 and a center axis 3c of a winding group forming the third winding circuit 3 have an interval of 90 mechanical degrees, that is, 180 electrical degrees. Consequently, a phase difference between the voltage vector 2v of the second winding circuit 2 and a voltage vector 3v of the third winding circuit 3 becomes 0 electrical degree. Also, the coil phase band r of the third winding circuit 3 and the coil phase band s of the fourth winding circuit 4 are at positions 180 mechanical degrees apart, that is, 360 electrical degrees apart. In other words, the center axis 3c of the winding group forming the third winding circuit 3 and a center axis 4c of a winding group forming the fourth winding circuit 4 have an interval of 180 mechanical degrees, that is, 360 electrical degrees. Consequently, a phase difference between the voltage vector 3v of the third winding circuit 3 and a voltage vector 4v of the fourth winding circuit 4 becomes 0°. By placing the coil phase bands having the same winding pitch according to the rule shown in FIG. 9, a voltage vector phase difference between the winding circuits can be lessened to 0° and further, the voltages can be equal in magnitude. The same applies to the other phase V and phase W.

As has been described, according to the stator winding of the electrical rotating machine of the third embodiment, as in the first embodiment and the second embodiment above, by setting an interval between positions of the center axes of the winding groups forming the winding circuits to a predetermined value and placing the coil phase bands so as to eliminate a voltage difference, a circulation current flowing between winding circuits is eliminated. Hence, there can be achieved an effect that a temperature rise of the winding and deterioration in efficiency caused by the occurrence of a loss can be avoided. Also, because the winding pitch of the coil phase bands is not varied, there is no need to provide a jumper wire to end portions of the coil phase bands. Hence, there can be achieved another effect that an increase in complexity of an end portion structure can be avoided, which can in turn enhance workability.

The embodiments above have described a case where two sets of parallel circuits each having two winding circuits are connected to two output terminals of each phase. It should be noted, however, that the same effects can be achieved as long as four winding circuits are connected in parallel to one output terminal and the layout relation of the coil phase bands described above is satisfied.

It should be understood that the respective embodiments of the invention can be combined without any restriction within the scope of the invention and the respective embodiments can be modified and omitted appropriately.

Same reference numerals in the drawings denote same or equivalent portions.

REFERENCE SIGNS LIST 1, 2, 3, and 4: winding circuit
a, b, c, d, e, f, g, h, p, q, r, and s: coil phase band
10: rotor
11: stator winding
1v, 2v, 3v, and 4v: voltage vector
1c, 2c, 3c, and 4c: center axis of winding group

The invention claimed is:

1. A stator winding of an electrical rotating machine, wherein:
each phase of a three-phase, four-pole, four-parallel-circuit stator winding of an electrical rotating machine is placed on a circumference and formed of two sets of parallel circuits, in each of which two winding circuits formed of winding groups having a same pitch are connected in parallel;
center axes of the winding groups of the two winding circuits in a same set of the parallel circuits are placed at positions spaced by 360 electrical degrees;
the winding group of each winding circuit is formed of two coil phase bands which are connected in series and have winding directions different from each other; and
the two coil phase bands are placed at mirror symmetrical positions with respect to the center axis of the winding group of the winding circuit.

* * * * *